US006883121B1

United States Patent
Jensen et al.

(10) Patent No.: US 6,883,121 B1
(45) Date of Patent: Apr. 19, 2005

(54) METHOD AND SYSTEM FOR MONITORING MICROPROCESSOR INTEGRITY

(75) Inventors: David W. Jensen, Cedar Rapids, IA (US); Steven E. Koenck, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 525 days.

(21) Appl. No.: 09/659,398

(22) Filed: Sep. 11, 2000

(51) Int. Cl.$^7$ ............................................. G06F 11/00
(52) U.S. Cl. ......................................... 714/49; 714/48
(58) Field of Search ........................... 714/49, 48, 21, 714/10; 701/3–18

(56) References Cited

U.S. PATENT DOCUMENTS

| | | | | |
|---|---|---|---|---|
| 3,991,406 A | * | 11/1976 | Downing et al. | 714/10 |
| 5,204,952 A | * | 4/1993 | Ayers et al. | 714/48 |
| 6,314,350 B1 | * | 11/2001 | Butz et al. | 701/34 |
| 6,401,013 B1 | * | 6/2002 | McElreath | 701/3 |
| 6,418,468 B1 | * | 7/2002 | Ahlstrom et al. | 709/223 |
| 6,456,928 B1 | * | 9/2002 | Johnson | 701/114 |

FOREIGN PATENT DOCUMENTS

| JP | 57-043255 | * 11/1982 | ........... G06F/11/30 |
|---|---|---|---|
| JP | 57043255 | * 11/1982 | ........... G06F/11/30 |

OTHER PUBLICATIONS

Printed page of website address as follows: http://www.ajile.com.

Co–pending patent application Docket No. 00CR029/KE entitled "Method And Apparatus For High Assurance Computing Using Virtual Machines On General Purpose Computing Resources" filed on an even date, inventor D. Greve.

* cited by examiner

*Primary Examiner*—Nadeem Iqbal
*Assistant Examiner*—Timothy M. Bonura
(74) *Attorney, Agent, or Firm*—Nathan O. Jensen; Kyle Eppele

(57) ABSTRACT

A system and method for enhancing the integrity of a system which uses a high performance, low assurance, general purpose microprocessor to execute an avionics software application and uses a high assurance, low performance microprocessor to monitor the output of the general purpose microprocessor, without the need for comparison of outputs from parallel processors executing functionally equivalent versions of the avionics software application. The monitoring microprocessor is used to analyze state transitions of the first microprocessor and to analyze the computed values output by said general purpose microprocessor, against predetermined limitations based upon aircraft limitations.

9 Claims, 2 Drawing Sheets

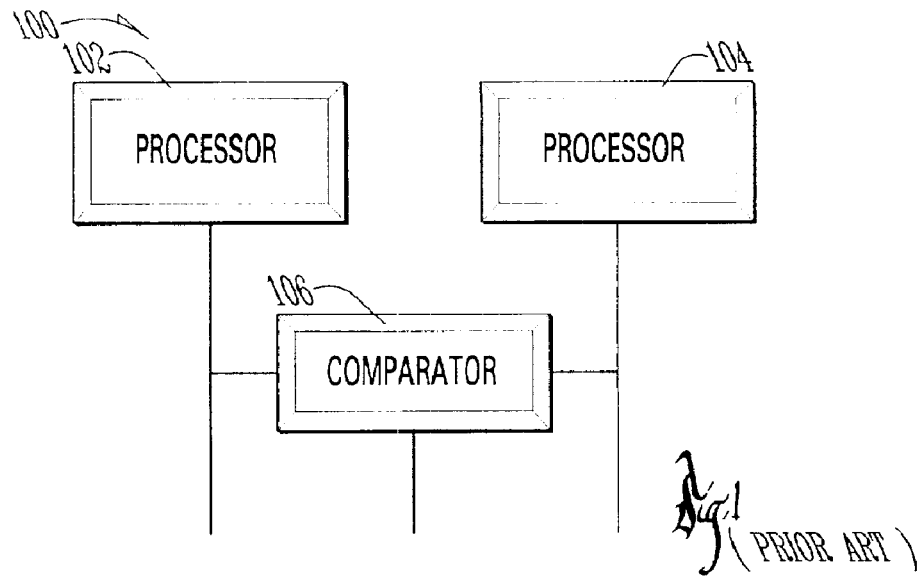
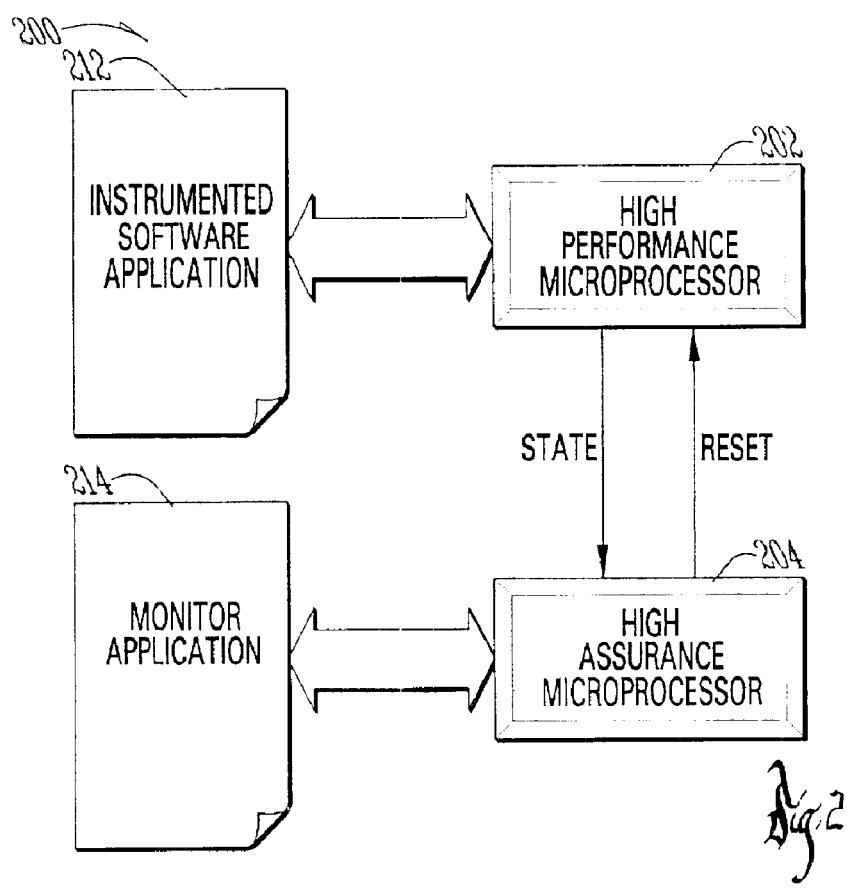

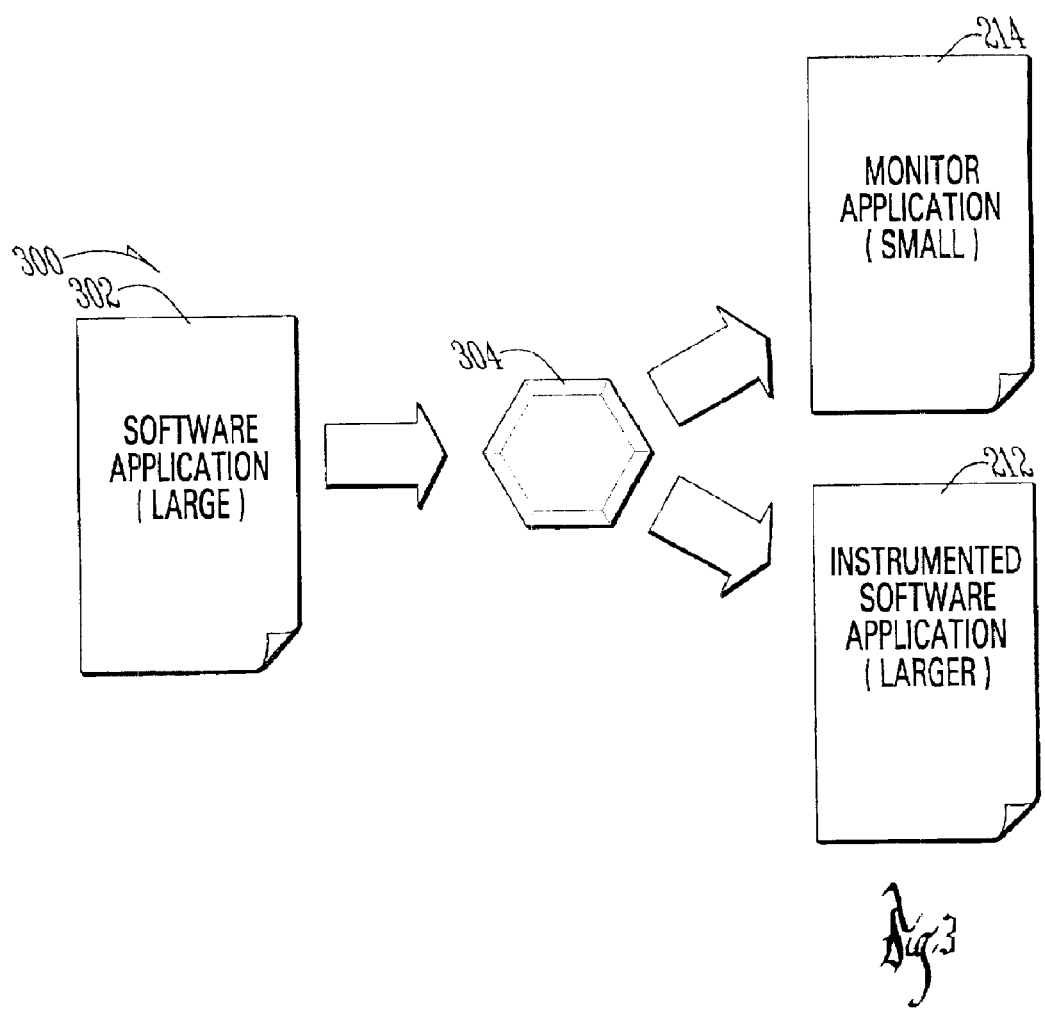

METHOD AND SYSTEM FOR MONITORING MICROPROCESSOR INTEGRITY

CROSS REFERENCE TO RELATED APPLICATION

The present invention relates to an application entitled "Method and Apparatus For High Assurance Computing Using Virtual Machines On General Purpose Computing Resources" by David A. Greve, filed on even date herewith and assigned to a common assignee. The contents of such application are incorporated herein in their entirety by reference.

FIELD OF THE INVENTION

The present invention generally relates to microprocessor systems, and more particularly relates to general purpose microprocessor systems, and even more particularly relates to methods and systems for enhancing the integrity of general purpose microprocessors.

BACKGROUND OF THE INVENTION

In recent years, multiple dissimilar general purpose microprocessor architectures have been used to attain a high level of assurance of integrity of general purpose microprocessor performance. These multiple processors are used in parallel, and their outputs are compared to reduce the likelihood of an undetected processor failure.

While these multiple dissimilar microprocessor architectures have been used extensively in the past, they do have some drawbacks. First of all, when these architectures are used for avionics computing systems, such as Flight Management Systems (FMS), Flight Control Systems (FCS), and any other avionics device or system, with their very long service lives, often in excess of thirty years, it frequently becomes very expensive to stock sufficient replacement parts. This problem is exacerbated by the rapid obsolescence and short production cycles for many modern general purpose microprocessors. Secondly, with the multiple dissimilar processor architecture, it is necessary to use separately designed, or at least separately compiled, software for each dissimilar processor. This, too, can be expensive to maintain over the service life of an avionics computing system.

Consequently, there exists a need for improved methods and systems for providing enhanced microprocessor integrity without the need for comparing the outputs of multiple dissimilar processors, operating in parallel.

SUMMARY OF THE INVENTION

It is an object of the present invention to provide a system and method for economically enhancing the integrity of microprocessors.

It is a feature of the present invention to utilize a high assurance microprocessor to monitor validity indicators of another microprocessor.

It is another feature of the present invention to monitor state changes in the monitored microprocessor.

It is an advantage of the present invention to eliminate the need for comparing the outputs of dual processors, operating in parallel and the concomitant expenses associated therewith.

The present invention is an apparatus and method for enhancing the integrity of general purpose microprocessors which are designed to satisfy the aforementioned needs, provide the previously stated objects, include the above-listed features, and achieve the already articulated advantages. The present invention is carried out in a "multiple, parallel operating, microprocessor-less" manner in a sense that the need to operate, in parallel, multiple dissimilar microprocessors and compare their outputs, has been eliminated.

Accordingly, the present invention is a computing system and method including a general purpose monitored microprocessor and a second high assurance monitoring microprocessor.

BRIEF DESCRIPTION OF THE DRAWINGS

The invention may be more fully understood by reading the following description of the preferred embodiments of the invention, in conjunction with the appended drawings wherein:

FIG. 1 is a block diagram view of a system of the prior art.

FIG. 2 is a block diagram view of a system of the present invention.

FIG. 3 is a simplified block flow diagram of a process of the present invention.

DETAILED DESCRIPTION

Now referring to the drawings wherein like numerals refer to like matter throughout, and more specifically referring to FIG. 1, there is shown a system of the prior art generally designated 100, including a first prior art general purpose commercially available microprocessor 102, such as an Intel Pentium microprocessor, a dissimilar second prior art general purpose commercially available microprocessor 104, such as a Motorola Power PC microprocessor, and a comparator 106, for comparing outputs of first prior art general purpose commercially available microprocessor 102 and second prior art general purpose commercially available microprocessor 104, to determine they are the same and thereby determine that no faults have occurred. A typical prior art dual processor system 100 might employ a command/monitor approach, whereby one processor generates an output and the other verifies that the output is correct. This verification may be performed by a comparator 106 that indicates if the processor outputs are different. A difference would indicate that one of the two processor subsystems is generating an incorrect output. No difference would indicate that both outputs are the same—either correct or incorrect. Either processor may alternately have authority to generate the output while being monitored by the other.

Now referring to FIG. 2, there is shown a simplified block diagram of an airborne avionics computing system of the present invention, generally designated 200, including a high performance general purpose commercially available microprocessor 202, such as, but not limited to, Intel Pentium processors, Motorola Power PC, Texas Instruments TMS 320, etc. These processors are known to provide high performance, which term is used herein to relate to clock speed, instructions per second, etc. The terms "general purpose" are used herein to refer to microprocessors which have a wide range of applicability and are not primarily designed for use in very limited and specific applications. The terms "commercially available" are used herein to refer to microprocessors which are available for purchase in commercial, wholesale and retail markets in the U.S. While these processors have widespread acceptance in the industry, these processors also are susceptible to faults which can produce computational errors during normal operation or may contain previously unknown design errors that produce unwanted behavior. To address the diminution in integrity resulting from such faults, there is included a high assurance lower performance microprocessor 204, which acts as a monitoring microprocessor, to monitor output characteristics of high performance general purpose commercially available microprocessor 202. A preferred microprocessor to be used as high assurance lower performance microprocessor 204 is the aJile AJ100, available from aJile Systems, Inc. of San Jose, Calif., which is a microprocessor capable of directly executing Java programs. The AJ100 processor implements the functionality of a Java Virtual Machine (JVM) as defined by Sun Microsystems, Inc., which is specially designed to operate with high assurance in the potentially malicious Internet domain. Verification of microprocessors to very high levels of assurance has typically been done with rigorous manual inspection of the hardware, microcode, and software implementations. Adherence to design processes, such as the industry standard RTCA/DO-178B and RTCA/DO-254 may be helpful to attain the desired level of design assurance. Variations of the AJ100 processor may be created with even higher assurance by the use of formal methods analysis. This well-known field of art involves the use of logical and mathematical proofs to establish the correctness of logic design, such as the type used to implement the functionality of a microprocessor. Although the AJ100 has been architecturally designed to be a high assurance microprocessor, receiving design processes, performing some manual inspections, and applying formal methods, each may be needed to completely verify this microprocessor to a very high level of assurance.

The terms "high assurance", "lower performance", "high performance", etc., as used herein are relative terms used to compare the two microprocessors 202 and 204. They are not intended to relate to some absolute scale by which any microprocessor could be classified. The speed of high assurance lower performance microprocessor 204 need not be as high as that of high performance general purpose commercially available microprocessor 202. However, it is preferred, but not essential, that high assurance lower performance microprocessor 204 be one that can be formally proven to the Federal Aviation Administration or other regulatory agency to have no faults or design errors. This provability of no faults provides the "high assurance" characteristics of high assurance lower performance microprocessor 204. Throughout this discussion, the terms "certified", "verified", "qualified", or "determined" or variations of these terms, with respect to the FAA or other agency of the U.S. government which regulates safety, shall mean any certification, verification, qualification, or determination made by such agency irrespective of whether its official designation is the same. Any determination by such agency which follows any inquiry or inspection by said agency shall be construed as being "certified", "verified", "qualified", or "determined" by such agency.

High assurance lower performance microprocessor 204 performs the functions of monitoring output characteristics of high performance general purpose commercially available microprocessor 202, such as state changes, range checking, sign checking, change rates and look up approximations. High assurance lower performance microprocessor 204 executes a monitor software application 214 to carry out the "auditing" of the high performance general purpose commercially available microprocessor 202. If an invalid state change or other validity indicator occurs, then a reset command is given from high assurance lower performance microprocessor 204 to high performance general purpose commercially available microprocessor 202 to force the high performance general purpose commercially available microprocessor 202 into a known valid state for recovery from the fault condition.

Mathematical calculation faults, such as the widely publicized Pentium FDIV bug, are known to occur and, therefore, must be addressed. One example of how this can occur is through validity checking. For example, when validity checking an airspeed calculation, first inputs from multiple sensors must be received and checked for validity against each other. The range of indications could be anywhere from 0 to some potentially high range (greater than a maximum safe speed for the aircraft). The situation history can provide validity information; for example, if the airspeed was 200 knots 10 seconds ago, it must be within +/−X knots where X is a predetermined maximum acceleration/deceleration characteristic of the aircraft. This sort of range/validity calculation is not easily extractable by a derived software method without substantial knowledge of the underlying avionics application being executed by the high performance general purpose commercially available microprocessor 202. Additionally, substantial effort is required to develop software to monitor such an avionics application.

A more detailed understanding of how the present invention can implemented can now be achieved by referring to FIG. 3, which shows:

a simplified block diagram of a process of the present invention, generally designated 300. The process relates to adapting an original predetermined avionics software application 302 for use with the present invention. An FAA qualified conversion tool 304 is created that processes the original predetermined avionics software application 302 and produces a monitor software application 214 and an instrumented software application 212. The monitor software application 214 executes on the high assurance lower performance microprocessor 204 (FIG. 2), and it validates that all state transitions in the instrumented software application 212 are correct. Instrumented software application 212 executes on high performance general purpose commercially available microprocessor 202 (FIG. 2) and outputs application state transitions as it executes. The qualified conversion tool 304 is designed to work with various types of microprocessors used for high performance general purpose commercially available microprocessor 202 and high assurance lower performance microprocessor 204. The precise details of conversion tool 304 will vary, depending upon the microprocessors and applications being used.

In operation, the apparatus and method of the present invention as described in FIGS. 2–3, could function as follows.

An original predetermined avionics software application 302 is certified by the FAA for use in revenue service in the U.S. This application is then transformed in two derived and dissimilar software applications, monitor software application 214, and instrumented software application 212, through the use of qualified conversion tool 304. Instrumented software application 212 and monitor software application 214 are then incorporated into avionics equipment having a high performance general purpose commercially available microprocessor 202, which executes the instrumented software application 212, and a high assurance lower performance microprocessor 204, which executes a monitor software application 214. When monitor software application 214 detects that an invalid event has occurred, then monitor software application 214 issues a reset command to high performance general purpose commercially available microprocessor 202. Additional post-fault detect processing can be performed in a manner similar to that as performed by the prior art system of FIG. 1. The following list outlines several errors that can occur in commercial microprocessors, such as high performance general purpose commercially available microprocessor 202. The present invention can resolve the following errors:

1. State change errors caused by mis-execution, which can be caused by operating system or other design flaws.
2. State change errors caused by changed data/registers. These errors can be caused by Single Event Upsets (SEUs) due to radiation effects in semiconductor devices.
3. State time expiration caused by locked process or instruction. Programmer errors or processor design flaws can be responsible for these types of errors.
4. Parameter or expression value errors caused by arithmetic unit flaw or programmer error.

In a preferred embodiment of the present invention, high assurance lower performance microprocessor 204 will detect the above listed errors. But, to fully benefit from the present invention, it could also be helpful to be able to monitor or trace the instructions executed of high performance general purpose commercially available microprocessor 202. This could be accomplished by an instruction trace buffer preferably disposed on the same Application Specific Integrated Circuit (ASIC) as used for the high performance general purpose commercially available microprocessor 202. If an invalid state transition or other error is detected by high assurance lower performance microprocessor 204, then the instruction trace buffer is used to capture information so that the offending state transition error can be identified and remedied or avoided in the future. The details of such an instruction trace buffer on an ASIC are within the ordinary skill of an artisan and need not be detailed here.

Throughout this description, reference is made to a high assurance lower performance microprocessor 204, as an independent physical microprocessor, because it is believed that the beneficial aspects of the present invention would be most readily apparent when used in connection with an actual monitoring microprocessor; however, it should be understood that the present invention is not intended to be limited to actual monitoring processor machines and should be hereby construed to include virtual machines implemented on the high performance general purpose commercially available microprocessor 202 as well. Of course, with such an arrangement, an error resulting in executing an instruction which locks up high performance general purpose commercially available microprocessor 202, could not be captured. However, a virtual machine approach could be successfully used to validate proper state changes and check parameter values.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. A computing system comprising:
a general purpose microprocessor for executing a predetermined software application;
a monitoring microprocessor having an assurance characteristic which is higher and having a performance characteristic which is lower than that of said general purpose microprocessor; said monitoring microprocessor coupled to and monitoring said general purpose microprocessor, where said monitoring does not involve real-time comparison of parallel computations made on parallel microprocessors;
wherein said general purpose microprocessor generates state transitions as said predetermined software application is executed;
wherein said monitoring microprocessor monitors said state transitions and generates a fault signal when a determination of invalidity of said state transitions is made by said monitoring microprocessor;
wherein said fault signal is a reset signal sent to said general purpose microprocessor; and
wherein said monitoring microprocessor has associated therewith a certification from an agency of the US government which regulates safety.

2. A system of claim 1 wherein said predetermined software application has associated therewith a certification from an agency of the U.S. government which regulates safety.

3. A computing system comprising:
a general purpose microprocessor for executing a predetermined software application;
a monitoring microprocessor having an assurance characteristic which is higher and having a performance characteristic which is lower than that of said general purpose microprocessor; said monitoring microprocessor coupled to and monitoring said general purpose microprocessor, where said monitoring does not involve real-time comparison of parallel computations made on parallel microprocessors;
wherein said monitoring involves comparing a value generated by said general purpose microprocessor with a value based upon predetermined criteria, which relate to physical and operational limitations of an aircraft; and
wherein said general purpose microprocessor is coupled with an instruction trace buffer disposed on a chip carrying said general purpose microprocessor, wherein said instruction trace buffer temporarily stores instructions as they are executed by said general purpose microprocessor, so as to be retrievable in an event that a fault signal is generated by said monitoring microprocessor.

4. A computing system comprising:
a general purpose microprocessor for executing a predetermined software application;
a monitoring microprocessor having an assurance characteristic which is higher and having a performance characteristic which is lower than that of said general purpose microprocessor; said monitoring microprocessor coupled to and monitoring said general purpose microprocessor, where said monitoring does not involve real-time comparison of parallel computations made on parallel microprocessors; and
wherein said monitoring microprocessor and said general purpose microprocessor execute derived dissimilar programs, which are derived from a common predetermined software application, where a software conversion tool is used to derive said dissimilar programs.

5. A system of claim 4 wherein said software conversion tool is a tool having associated therewith a certification from an agency of the US government which regulates safety.

6. A system of claim 5 wherein software conversion tool causes said predetermined software application to generate state transition signals when executed on said general purpose microprocessor.

7. A method of enhancing an integrity characteristic of an airborne avionics computing system comprising the steps of:

providing a first microprocessor, which executes a predetermined avionics software application, and thereby generates a calculated value;

providing a second microprocessor which is coupled to said first microprocessor; and, enhancing an integrity of said calculated value by monitoring, with said second processor, an output of said first microprocessor, where said monitoring is not a comparison of parallel computations made by parallel processors, and said output is not a failure status of said first microprocessor.

8. A method of claim 7 wherein said step of enhancing includes the steps of:

generating state transition signals during an execution of said predetermined avionics software application;

comparing said state transition signals, by said second microprocessor, against predetermined criteria and generating a fault signal in response thereto; and, resetting said first microprocessor in response to said fault signal.

9. A method of claim 7 wherein said step of enhancing includes the steps of:

comparing said calculated value to predetermined limitations associated with physical limitations of an aircraft; and, generating a fault signal when said calculated value exceeds said predetermined limitations.

* * * * *